(12) United States Patent
Counterman (10) Patent No.: US 9,202,016 B2
(45) Date of Patent: Dec. 1, 2015

(54) MANAGEMENT OF PRIVATE INFORMATION

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 635 days.

(21) Appl. No.: 13/586,394

(22) Filed: Aug. 15, 2012

(65) Prior Publication Data

US 2014/0053242 A1    Feb. 20, 2014

(51) Int. Cl.
```
G06F 21/00      (2013.01)
H04L 29/08      (2006.01)
H04L 29/06      (2006.01)
```

(52) U.S. Cl.
CPC ............... *G06F 21/00* (2013.01); *H04L 63/08* (2013.01); *H04L 67/306* (2013.01)

(58) Field of Classification Search
CPC . G06F 21/00; G06F 21/31; G06F 2221/2115; G06F 2221/2111; H04L 63/0823; H04L 63/0876; H04L 63/08; H04L 63/102; H04L 63/0884; H04L 9/321; H04L 67/306; H04W 4/02; H04W 12/08; H04W 64/00
See application file for complete search history.

(56) References Cited

U.S. PATENT DOCUMENTS

| | | | |
|---|---|---|---|
| 7,093,286 B1 * | 8/2006 | King | 726/12 |
| 7,350,074 B2 * | 3/2008 | Gupta et al. | 713/157 |
| 7,748,047 B2 * | 6/2010 | O'Neill | 726/29 |
| 7,970,827 B1 * | 6/2011 | Cumberbatch et al. | 709/204 |
| 8,132,242 B1 * | 3/2012 | Wu | 726/8 |
| 8,250,632 B1 * | 8/2012 | Staddon | 726/4 |
| 8,943,047 B1 * | 1/2015 | Carpio et al. | 707/723 |
| 2002/0115446 A1 * | 8/2002 | Boss et al. | 455/456 |
| 2003/0083045 A1 * | 5/2003 | Blight et al. | 455/412 |
| 2004/0203901 A1 * | 10/2004 | Wilson et al. | 455/456.1 |
| 2005/0044377 A1 * | 2/2005 | Huang | 713/182 |
| 2005/0131949 A1 * | 6/2005 | Matsuyama et al. | 707/104.1 |
| 2005/0132075 A1 * | 6/2005 | Creamer et al. | 709/229 |
| 2006/0015566 A1 * | 1/2006 | Sampson | 709/206 |
| 2006/0085360 A1 * | 4/2006 | Grim et al. | 705/67 |
| 2006/0085844 A1 * | 4/2006 | Buer et al. | 726/4 |
| 2006/0259492 A1 * | 11/2006 | Jun et al. | 707/9 |

(Continued)

FOREIGN PATENT DOCUMENTS

| | | | | |
|---|---|---|---|---|
| JP | 2011076475 A | * | 4/2011 | |
| WO | WO 2005041608 A1 | * | 5/2005 | H04Q 7/38 |

(Continued)

OTHER PUBLICATIONS

Vollbrecht, "AAA Authorization Application Examples", RFC 2905, Aug. 2000, 53 pages.*

(Continued)

*Primary Examiner* — Andrew Nalven
*Assistant Examiner* — Walter Malinowski (57) ABSTRACT

A network device is configured to receive a request, from a device, for private information associated with a user of a user device, on behalf of another user device. The network device may authenticate the device, the user device, and the other user device. The network device may request and receive the user's authorization to send the private information to the other user device. The network device may generate and send a token used to request the private information. The network device may receive the token from the device, determine that the token is valid, and send the private information.

20 Claims, 9 Drawing Sheets

(56) References Cited

U.S. PATENT DOCUMENTS

| | | | |
|---|---|---|---|
| 2007/0083917 A1* | 4/2007 | Peterson et al. | 726/5 |
| 2007/0149214 A1* | 6/2007 | Walsh et al. | 455/456.1 |
| 2007/0192438 A1* | 8/2007 | Goei | 709/219 |
| 2007/0281689 A1* | 12/2007 | Altman et al. | 455/435.1 |
| 2008/0052371 A1* | 2/2008 | Partovi et al. | 709/217 |
| 2008/0070593 A1* | 3/2008 | Altman et al. | 455/457 |
| 2008/0127310 A1* | 5/2008 | Robbins et al. | 726/4 |
| 2008/0288600 A1* | 11/2008 | Clark | 709/206 |
| 2009/0070412 A1* | 3/2009 | D'Angelo et al. | 709/203 |
| 2009/0106848 A1* | 4/2009 | Coley | 726/26 |
| 2009/0117883 A1* | 5/2009 | Coffing et al. | 455/414.1 |
| 2009/0138547 A1* | 5/2009 | Boudreau | 709/203 |
| 2009/0222669 A1* | 9/2009 | Huang et al. | 713/182 |
| 2009/0252329 A1* | 10/2009 | Casey et al. | 380/279 |
| 2010/0146603 A1* | 6/2010 | Lee et al. | 726/6 |
| 2010/0235888 A1* | 9/2010 | Miyamoto | 726/4 |
| 2010/0325194 A1* | 12/2010 | Williamson et al. | 709/203 |
| 2011/0116493 A1* | 5/2011 | Caceres et al. | 370/352 |
| 2011/0161176 A1* | 6/2011 | Ai | 705/14.66 |
| 2011/0161432 A1* | 6/2011 | Ellanti | 709/206 |
| 2011/0282972 A1* | 11/2011 | Rosen | 709/219 |
| 2011/0292837 A1* | 12/2011 | Nakamura et al. | 370/256 |
| 2011/0320375 A1* | 12/2011 | Zrike et al. | 705/319 |
| 2012/0036360 A1* | 2/2012 | Bassu et al. | 713/168 |
| 2012/0054841 A1* | 3/2012 | Schultz et al. | 726/6 |
| 2012/0054847 A1* | 3/2012 | Schultz et al. | 726/9 |
| 2012/0130794 A1* | 5/2012 | Strieder | 705/14.27 |
| 2012/0210011 A1* | 8/2012 | Liu et al. | 709/229 |
| 2012/0240211 A1* | 9/2012 | Counterman | 726/9 |
| 2012/0317229 A1* | 12/2012 | Shimakawa | 709/217 |
| 2012/0331567 A1* | 12/2012 | Shelton | 726/28 |
| 2013/0024277 A1* | 1/2013 | Tuchman et al. | 705/14.49 |
| 2013/0030901 A1* | 1/2013 | Eichstaedt et al. | 705/14.26 |
| 2013/0054481 A1* | 2/2013 | Upadhyaya | 705/319 |
| 2013/0082819 A1* | 4/2013 | Cotterill | 340/5.51 |
| 2013/0205197 A1* | 8/2013 | O'Neill | 715/236 |
| 2013/0227291 A1* | 8/2013 | Ahmed et al. | 713/171 |
| 2013/0276086 A1* | 10/2013 | Yu | 726/9 |
| 2013/0281122 A1* | 10/2013 | Zelinka | 455/456.3 |
| 2014/0040989 A1* | 2/2014 | Davis et al. | 726/4 |

FOREIGN PATENT DOCUMENTS

WO    WO 2009089764 A1 *   7/2009
WO    WO 2010043134 A1 *   4/2010

OTHER PUBLICATIONS

"USB Two Factor Authentication a Novel Methodology for Physically Authenticating a New Hardware Device", Defensive Publications, Jul. 28, 2009, 5 pages.*

E. Hammer et al., "The OAuth 2.0 Authorization Protocol draft-ietf-oauth-v2-23," https://tools.ietf.org/html/draft-ietf-oauth-v2-23, Jan. 21, 2012, 44 pages.

* cited by examiner

MANAGEMENT OF PRIVATE INFORMATION

BACKGROUND

A subscriber to a network may have a variety of private information stored by a provider of the network. This private information may include personal information (e.g., age, home address, gender) and may also include private information relating to communications (e.g., phone calls, text messages, and/or downloaded content) between the network and a user device associated with the subscriber.

DETAILED DESCRIPTION OF PREFERRED EMBODIMENTS

The following detailed description refers to the accompanying drawings. The same reference numbers in different drawings may identify the same or similar elements.

Systems and/or methods described herein may create a token that permits for sending private information, regarding a subscriber to a network, to other parties, based on conditions regarding what private information may be sent to the other parties and how the private information may be used by the other parties. For example, a third party (e.g., a bank) may contact a service provider for a network (e.g., a wireless network) and request the service provider to send private information (e.g., date of birth, home address, location information, etc.) regarding a subscriber (to the network) to the third party. The third party may agree with the service provider's conditions on what private information may be obtained, how the private information may be used, and/or for how long the private information may be used. Information associated with the agreement may be sent to a network device within the network. The network device may send an authorization request to the subscriber. The subscriber, using a user device, may send a message to authorize sending the subscriber's private information to the third party. The network device may receive the authorization and may generate a token that may be used to retrieve the subscriber's private information. The network device may send the token to a computing device used by the third party. The third party may use the token to request private information, based on the subscriber's authorization, from the network device.

Figure 1A:
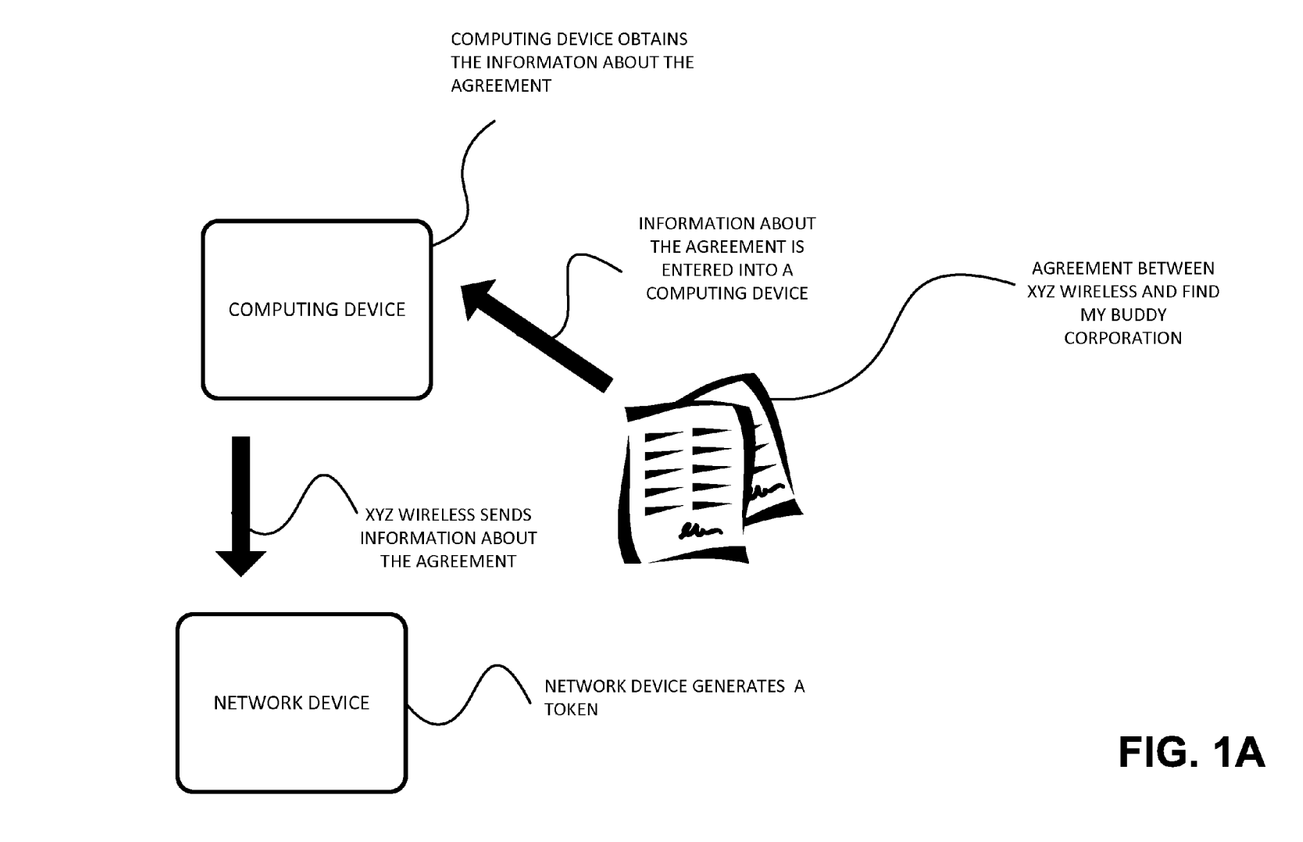
FIGS. 1A-1C are diagrams of an overview of an implementation described herein.
Figure 1B:
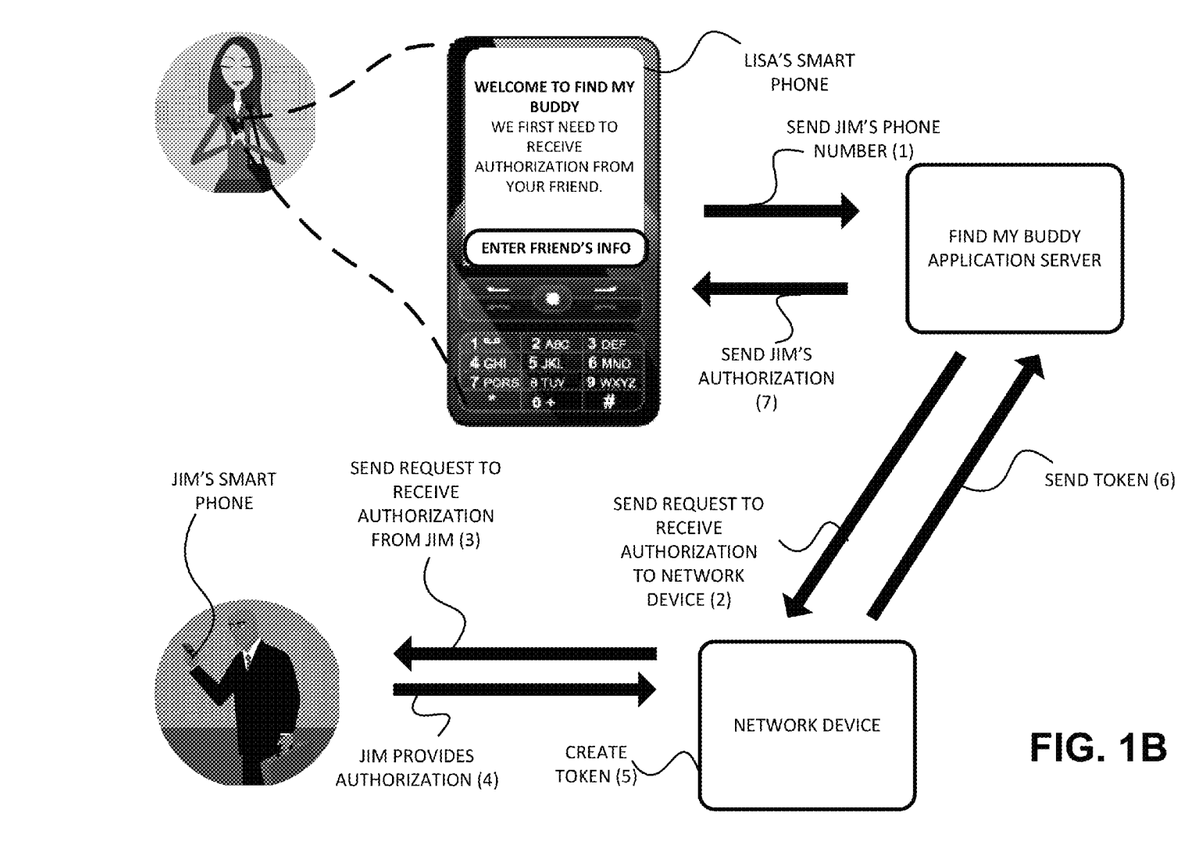
Figure 1C:
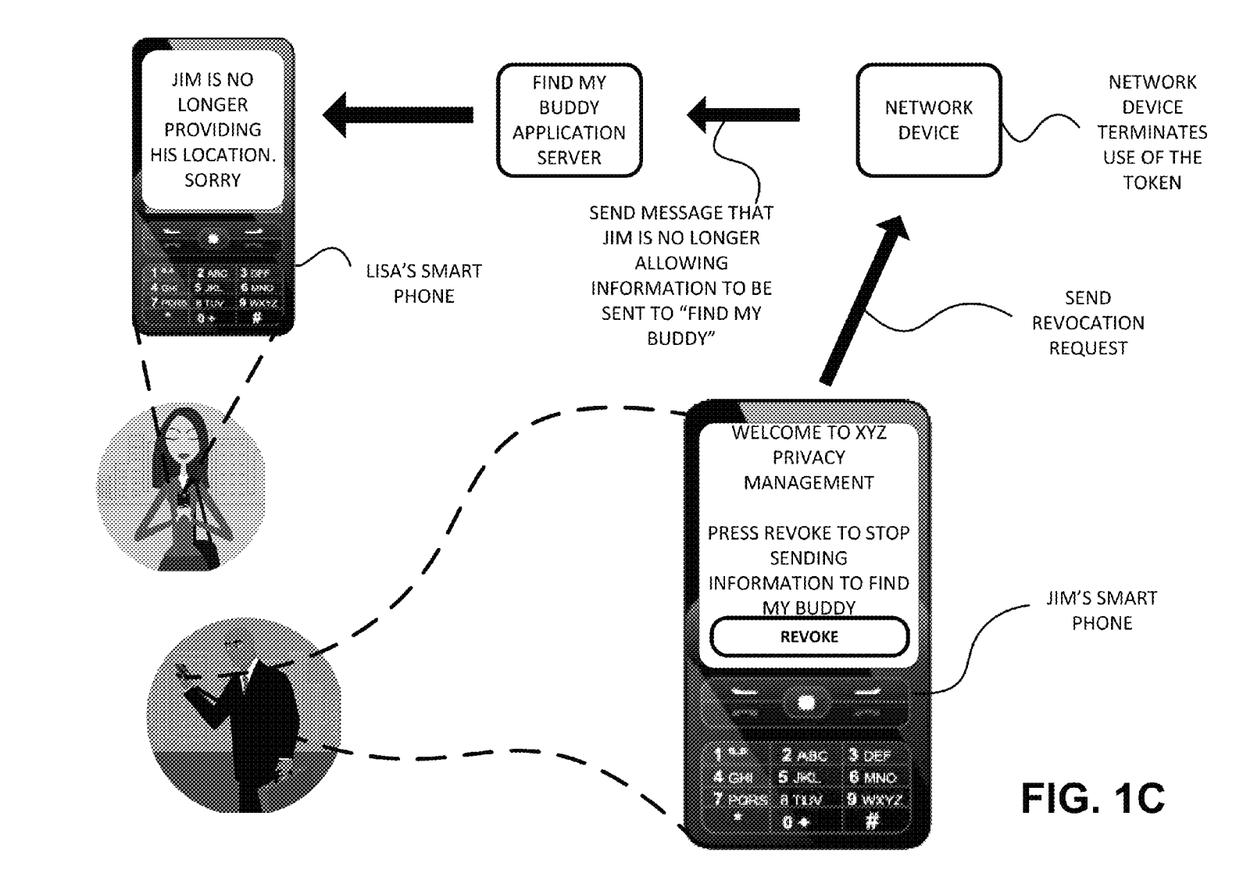

FIGS. 1A-1C are diagrams of an overview of an implementation described herein. Assume that Find My Buddy Corporation has created an application ("Find My Buddy") that is used for finding the location of a person, based on the location of a wireless user device (e.g., a smart phone). XYZ Wireless is a provider of a wireless network. Assume that the person is a subscriber to services provided by XYZ Wireless. As shown in FIG. 1A, Find My Buddy Corporation may accept terms from XYZ Wireless regarding how Find My Buddy Corporation can receive and use information regarding a subscriber to XYZ Wireless and/or the usage of a wireless user device (registered by the subscriber to use the wireless network provided by XYZ Wireless). XYZ Wireless may permit Find My Buddy Corporation to request location information regarding a subscriber to XYZ Wireless. XYZ Wireless may permit Find My Buddy Corporation to receive the location information by first receiving express permission from a subscriber. The terms of permitting Find My Buddy Corporation to use a subscriber's location information may also include requirements that Find My Buddy Corporation may not send the location information, of a subscriber of XYZ Wireless, to another party, and that Find My Buddy Corporation may not store the private information of a subscriber, once the subscriber revokes Find My Buddy Corporation's permission to receive the private information.

XYZ Wireless may take information associated with the agreement and provide the information into a computing device. The computing device (e.g., a computer) may send the information to a network device in the wireless network (operated by XYZ Wireless). The network device may store the information.

As shown in FIG. 1B, Lisa has the Find My Buddy application downloaded on her smart phone (Lisa's smart phone). Lisa decides that she would like to get location information regarding her friend, Jim. Lisa enters Jim's phone number (associated with Jim's smart phone) into the Find My Buddy application. A message, including Jim's phone number is sent from Lisa's smart phone to the Find My Buddy application server (identified by (1) in FIG. 1B). The Find My Buddy application server receives Jim's phone number (from Lisa's smart phone) and sends a message to the network device (identified by (2) in FIG. 1B) that is part of the network operated by XYZ Wireless. The message may request Jim's location information from XYZ Wireless. The network device may determine that the Find My Buddy application is authorized by XYZ Wireless (as described with regard to FIG. 1A) to make a request for Jim's location information. The network device may send a message to Jim's smart phone (using the smart phone's mobile device number ("MDN")) requesting Jim to provide his authorization to permit Lisa's smart phone to receive information regarding Jim's location (identified by (3) in FIG. 1B). The message may include information regarding how Jim's private information (Jim's location) is to be used. The message may include the information regarding the agreement reached by XYZ Wireless and Find My Buddy Corporation.

Jim's smart phone may receive the message, and after Jim views the message, Jim may send a message, using his smart phone, to the network device. The message may include an authorization for the Find My Buddy application to receive Jim's location information (identified by (4) in FIG. 1B). The network device may receive the message, and based on the authorization, the network device may create a token (identified by (5) in FIG. 1B). The token may be used to obtain Jim's information according to the agreement, described with regard to FIG. 1A. The token may be sent to the Find My Buddy application server (identified by (6) in FIG. 1B). The Find My Buddy application server may receive the token. The Find My Buddy application server may send a message to Lisa's smart phone that Jim has authorized his location information (based on the location of Jim's smart phone) to be sent to Lisa's smart phone (identified by (7) in FIG. 1B).

Lisa may now view Jim's location (based on Jim having his smart phone with him) by sending messages to the Find My Buddy application server. The Find My Buddy application server may receive a message from Lisa and send the token to the network device. The network device may analyze the token (to determine whether the token is valid and the information being requested is in accordance with the agreement) and the network device may determine that the token is valid. The network device may send Jim's location information to the Find My Buddy application server. The Find My Buddy application server may send Jim's location information to Lisa's smart phone.

Assume that at a later time and with reference to FIG. 1C, Jim decides that he does not want Lisa knowing his location. Jim opens a privacy management application (provided by XYZ Wireless) on his smart phone. Jim decides that he would like to revoke his authorization to send location information to Lisa's smart phone. Jim selects "revoke," and a message is sent from Jim's smart phone to the network device. The network device may receive the revoke message. The network device may terminate the use of the token. The network device may send a message to the Find My Buddy application server that Jim is no longer permitting Jim's location information to be sent to the Find My Buddy application stored on Lisa's smart phone. The Find My Buddy application server may send a message to Lisa's smart phone that Jim is no longer permitting Lisa to view Jim's location information.

As a result, the private information regarding a person and/or the private information regarding usage of a user device (used by the person) may be controlled by the person as far as which other persons, groups, or companies may access the private information and how the private information may be used and stored. This may permit a person to have control of their private information and may prevent private information from being sent to an unauthorized requestor of private information.

Figure 2:
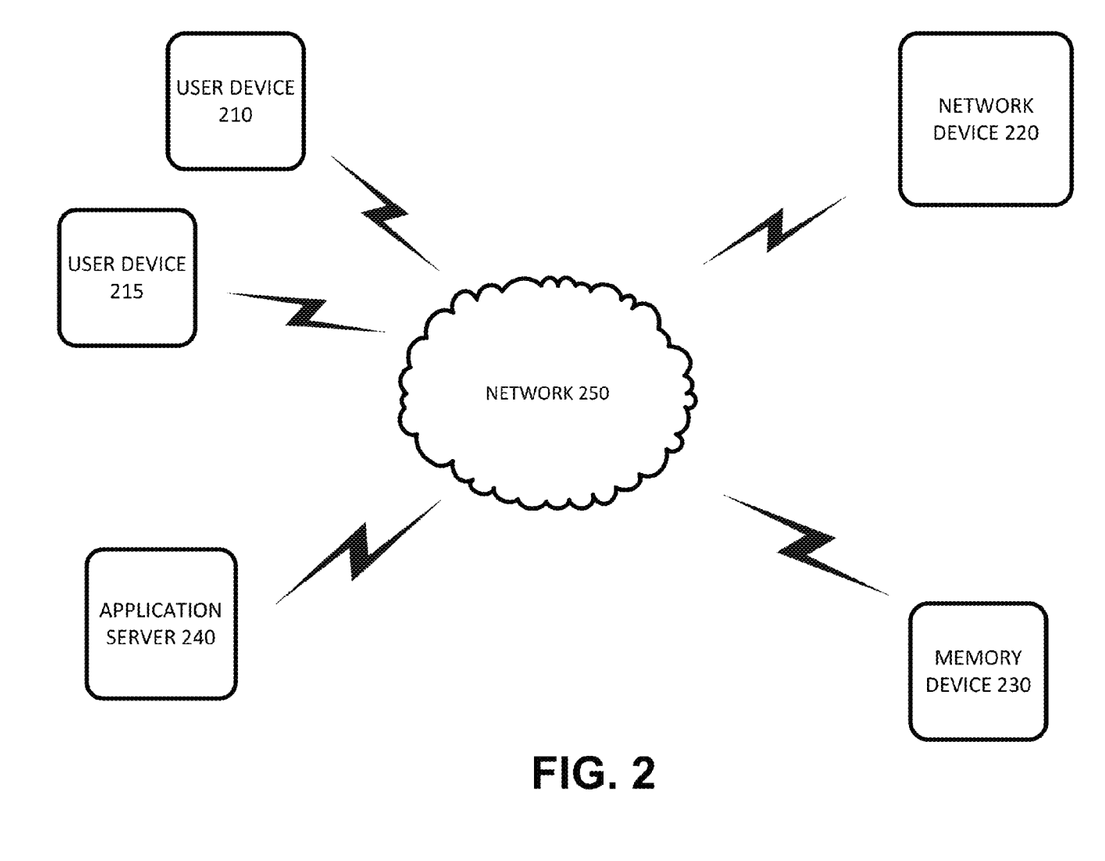
FIG. 2 is a diagram of an example environment in which systems and/or methods described herein may be implemented.

FIG. 2 is a diagram of an example environment 200, in which systems and/or methods described herein may be implemented. The quantity of devices and/or networks illustrated in FIG. 2 is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices in environment 200 may perform one or more functions described as being performed by another one or more of the devices in environment 200. Devices of environment 200 may interconnect via wired connections, wireless connections, or a combination of wired and wireless connections.

As shown in FIG. 2, environment 200 may include a user device 210, a user device 215, a network device 220, a memory device 230, an application server 240, and a network 250. For the purposes of this description, assume that a network service provider, using network 250, provides service (e.g., phone services, Internet service, etc.) to user device 210. User device 210 may be associated with a subscriber to network 250. Assume that the network service provider operates network device 220. Assume that user device 215 may be associated with a second party that is requesting private information regarding the subscriber. Further assume that the second party may request private information based on a third party coming to an agreement (e.g., such as the agreement described with regard to FIG. 1A) with the network service provider regarding receiving and using private information. Assume that the third party may be associated with the operation of application server 240. The second party and the third party may be the same party or may be two separate parties.

User device 210 and user device 215 may include any computation or communication device that is capable of communicating with a network (e.g., network 250). For example, user device 210 and user device 215 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, a television, a set top box, a digital video recorder (DVR), or another type of mobile computation or communication device.

User device 210 and user device 215 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

Network device 220 may include one or more network devices, or other types of computational or communication devices, that gather, process, search, store, and/or provide information in a manner described herein. Network device 220 may receive requests for private information, regarding a subscriber to a network that includes network device 220, and/or private information regarding usage information (e.g., type of content downloaded) for a user device (e.g., user device 210) registered to the network by the subscriber. Network device 220 may store information associated with agreements between a provider of network services and other parties. Network device 220 may store private information. Network device 220 may generate a token that may be used to request private information regarding a subscriber associated with user device 210. Network device 220 may be associated with the process of revoking the use of a token.

Memory device 230 may include one or more memory, or network, devices that gather, process, store and/or provide information described herein. Memory device 230 may store private information regarding a subscriber associated with user device 210. The private information may include information relating to a subscriber's age, gender, race, social security number, date of birth, home address, place of employment, credit score, financial information, bank account information, income, loan information, location information, and/or any other information that may not be publicly available. The private information may include communications (e.g., content being sent to user device 210, incoming/outgoing phone calls, pings, emails, text messages, etc.) between user device 210 and network 250.

In one example implementation, memory device 230 may be a part of network device 220. In another example implementation, memory device 230 may be a separate device separate from network device 220.

Application server 240 may include one or more network devices, or other types of computation or communication devices that gather, process, and/or provide information in a manner described herein. Application server 240 may provide an application that may be used by user device 210 and/or user device 215. The application may be an e-mail application, a telephone application, a multi-media application, a calendar application, an instant messaging application, a location-based application (e.g., a GPS-based application), and/or other types of applications (e.g., a visual voicemail application, video application, etc.). For example application server 240 may send, via network 250, information to user device 210, user device 215, and/or network device 220. Additionally, or alternatively, application server 240 may request, via network 250, information from user device 210, user device 215, and/or network device 220.

Network 250 may include a cellular network, a public land mobile network (PLMN), a second generation (2G) network, a third generation (3G) network, a fourth generation (4G) network, a fifth generation (5G) network and/or another network. Additionally, or alternatively, network 220 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 220 may support secure communications via a private network (e.g., a virtual private network (VPN) or a private IP VPN (PIP VPN), and/or secure communications via a public network).

Figure 3:
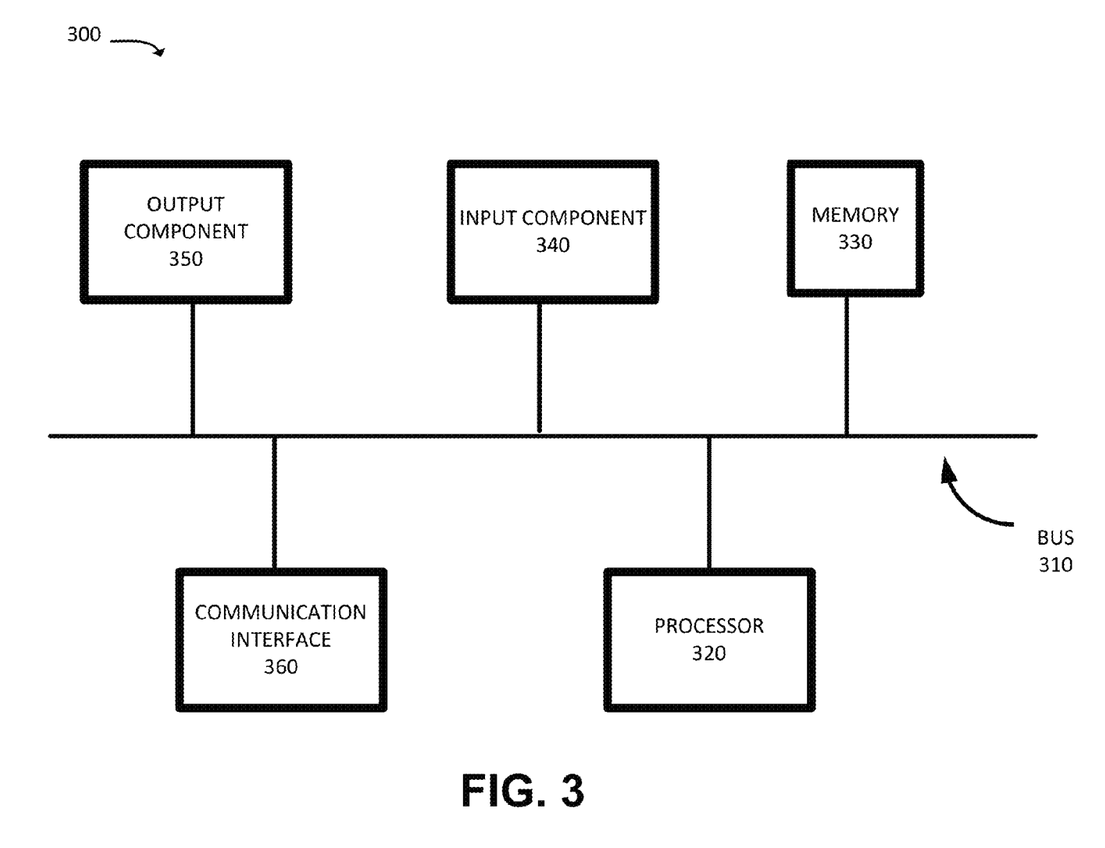
FIG. 3 is a diagram of example components of one or more devices of FIGS. 1A-1C and FIG. 2.

FIG. 3 is a diagram of example components of a device 300. Device 300 may correspond to user device 210, network device 220, memory device 230, and application server 240. Alternatively, or additionally, user device 210, network device 220, memory device 230, and/or application server 240 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 250 and/or devices connected to network 250.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
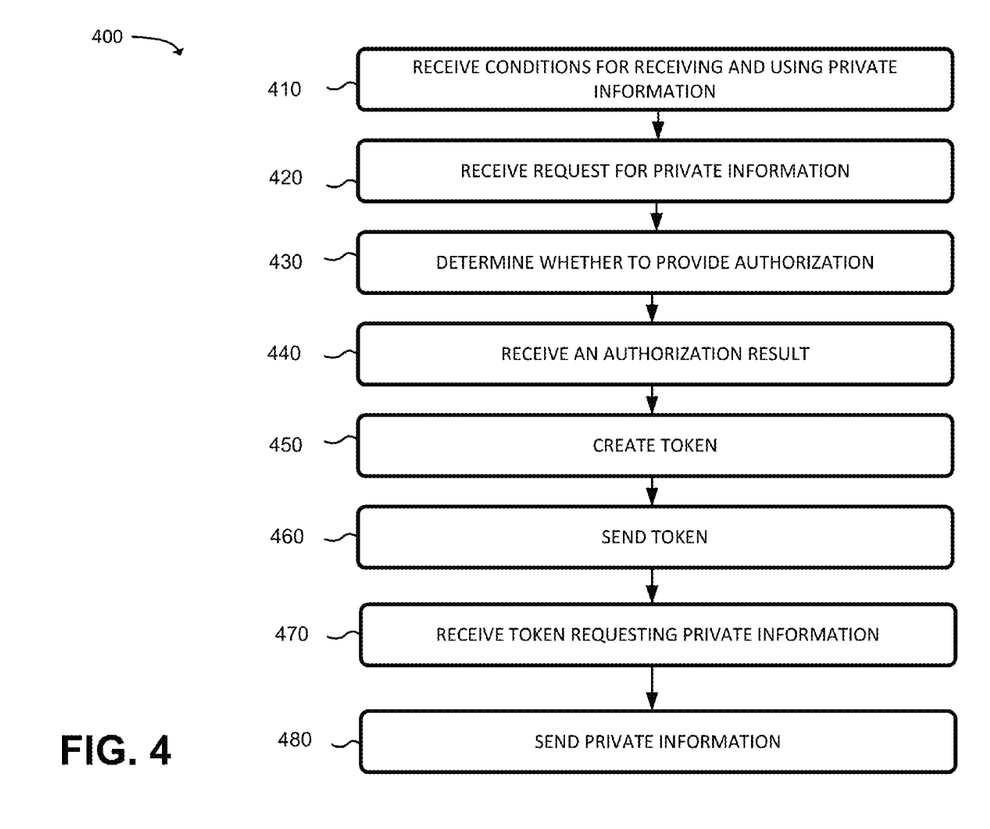
FIG. 4 is a flow chart of an example process for creating and using a token.

FIG. 4 is a flow chart of an example process 400 for creating and using a token. In one implementation, process 400 may be performed by network device 220. In another implementation, one or more blocks of process 400 may be performed by one or more other devices, such as user device 210.

Process 400 may include receiving conditions for receiving and using private information (block 410). For example, network device 220 may receive conditions for receiving and using private information based on an agreement between a network service provider and a third party (described with regard to FIG. 2).

The conditions may include what private information, associated with a subscriber, may be sent to the third party; how the private information may be used by the third party; when the private information may be sent to the third party; and for how long the private information may be sent to the third party. The third party may be associated with application server 240. Network device 220 may store the information associated with the agreement. Application server 240 may be requesting the private information based upon a request (for the private information) from user device 215.

Alternatively, network device 220 may receive information associated with conditions for receiving and using private information from the subscriber, using user device 210. The subscriber may have received a request from the network service provider for the subscriber to review the agreement. The subscriber may have reviewed the agreement. The subscriber may have the option to accept the agreement, reject the agreement, or alter the terms of the agreement.

For example, the subscriber may choose to only send particular private information (e.g., home address) and may choose not to send other types of private information (e.g., social security number) to the third party. The subscriber may choose to send private information to the third party for an interval of time. For example, the subscriber may choose to send private information for only 24 hour time period. The subscriber, via a user interface (e.g., web page), may send (using user device 210) the conditions for receiving and using private information to network device 220.

Process 400 may include receiving a request for private information (block 420). For example, network device 220 may receive a request from application server 240 based upon a request by the subscriber to send the private information. The subscriber may be requesting their own private information on behalf of the third party (e.g., a bank from which the subscriber is applying for a bank loan). Network 220 may authenticate user device 210 (e.g., using identifier information for user device 210) as a valid user device based on user device 210 being registered for the subscriber with the network. Network device 220 may authenticate application server 240 by determining that application server 240 is associated with the third party that agreed to the network service provider's conditions regarding receiving and using the private information.

Alternatively, application server 240 may be requesting the private information based on a request for private information from user device 215. Network device 220 may authenticate (as described above) that application server 240 is valid for making requests for private information from network device 220 based on the agreement. Network device 220 may authenticate user device 215, based on user device 215 using application server 240 to request the private information.

Alternatively, application server 240 may be requesting the private information so that the private information may be stored by application server 240 and may be used at a later time (e.g., storing the private information for generating analysis, such as marketing analysis) by application server 240.

Process 400 may include determining whether to provide authorization (block 430). For example, network device 220 may send an authorization request to the subscriber (via user device 210) requesting the subscriber to authorize sending private information to the third party. Prior to sending the authorization request, network device 220 may authenticate user device 210 as a user device that is registered with the network service provider.

The subscriber may review the authorization request and may determine that the private information may be sent to the third party. Alternatively, the subscriber may review the authorization request and determine that the private information should not be sent. The subscriber may deny the authorization request. Alternatively, the subscriber may review the authorization request, and may determine that some of the information, being requested, should be sent. The subscriber may use a user interface (accessible from user device 210) to select which information may be sent to the third party.

Alternatively, network device 220 may determine whether to authorize the request for private information. Network device 220 may have received, from the subscriber, conditions regarding on the use of the private information (described with regard to block 410). Network device 220 may, based on the previously provided permission from the subscriber, send the private information to the third party.

Process 400 may include receiving an authorization result (block 440). For example, network device 220 may receive an authorization result based on whether private information regarding the subscriber and/or user device 210, may be sent to the third party. Network device 220 may receive an authorization result (from user device 210) that indicates that the subscriber authorizes the private information to be sent to the third party.

Alternatively, network device 220 may receive an authorization result that indicates that the subscriber does not authorize private information to be sent to the third party. Network device 220 may send a message to application server 240 and/or user device 215 that the subscriber does not authorize sending private information to the third party.

Alternatively, network device 220 may receive a partial authorization result, from user device 210, that indicates that the subscriber authorizes some private information may be sent to the third party. For example, the subscriber may not want to send their home address information (being requested by application server 240 and/or user device 215), even though the agreement (described with regard to block 510) may permitting the third party to request home address information regarding the subscriber. Network device 220 may send a message to application server 240 and/or user device 215 that the subscriber authorizes sending some of the requested private information to the third party. The third party (and/or a second party, associated with user device 215) may agree to the partial authorization and may send a message (via application server 240 and/or user device 215) to network device 220 that the third party (and/or the second party) agrees to the subscriber's decision.

Process 400 may include creating a token (block 450). For example, network device 220 may create a token. The token may be used, by the third party, to retrieve private information (regarding the subscriber and/or user device 210) based on the authorization result associated with full or partial subscriber authorization (described with regard to block 440 in FIG. 4). The token may be used to: limit the type of private information (e.g., home address information, location information, the type of content being played on user device 210, incoming/outgoing phone calls, etc.) that can be sent to the third party; limit when the private information may be sent to the third party (e.g., the token permits the other party to receive private information for 24 hours after the token is created, or the token may be used to obtain private information regarding the user from Monday to Friday only); send private information to the third party when user device 210 is in a specified geographic location (e.g., the token permits the other party to receive location information when the subscriber, using user device 210, is in Florida); send the type of private information based on type of service that the subscriber may be using on user device 210 (e.g., the token permits the other party to receive private information when the user is using the smart phone to send short message service ("SMS") texts); and/or to limit the type of private information based on the type of content the subscriber (or another user) may be playing, listening, and/or viewing on user device 210 (e.g., location information is sent when the user is using user device 210 to download content associated with restaurant reviews). The conditions for sending the private information may change and may result in the characteristics of what private information the token may be used to access.

Process 400 may include sending the token (block 460). For example, network device 220 may send the token to application server 240 and/or user device 215. Application server 240 may receive the token, and may use the token to receive private information regarding the subscriber.

Process 400 may include receiving a token requesting private information (block 470). For example, network device 220 may receive a token, associated with a request for private information, from application server 240. Network device 220 may receive the token and may determine that the token is valid (based on an identifier associated with the token). Network device 220 may determine the private information be sent to application server 240 and/or user device 215. Network device 220 may determine what and when the private information should be sent (described with regard to block 450 in FIG. 4).

In one example implementation, network device 220 may receive the token and retrieve the private information, regarding the subscriber and/or user device 210, stored in network device 220. In another example implementation, network device 220 may receive the token and retrieve the private information, regarding the subscriber and/or user device 210, stored in memory device 230.

Network device 220 may store information associated with the number of times that the other party sends the token to request the private information of the user. Additionally, or alternatively, network device 220 may store other information regarding the usage of the token (e.g., number of times the token is used during the weekend).

Process 400 may include sending the private information (block 480). For example, network device 220 may send the private information to user device 215, via application server 240, or network device 220 may send the private information to application server 240.

Figure 5:
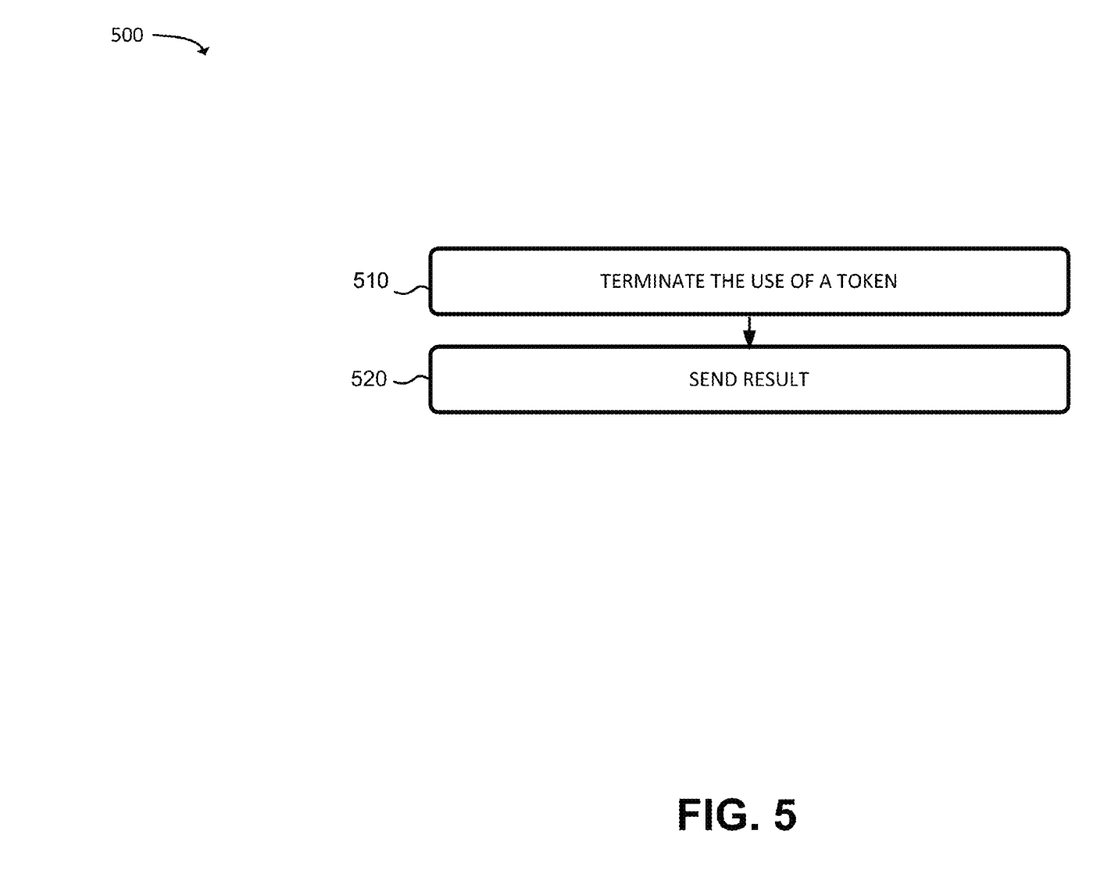
FIG. 5 is a flow chart of an example process for revoking a token.

FIG. 5 is a flow chart of an example process 500 for terminating the use of a token (block 510). In one implementation, process 500 may be performed by network device 220. In another implementation, one or more blocks of process 500 may be performed by one or more other devices, such as user device 210.

Process 500 may include terminating the use of a token (block 510). For example, network device 220 may receive a request from a subscriber that private information, being sent to another party (e.g., a marketing firm), may no longer be sent to the other party.

The subscriber may use a web page, or another user interface, on user device 210, to send the termination request to network device 220. Alternatively, network device 220 may use information (associated with the agreement, described with regard to block 410 or block 470 in FIG. 4) that the token is no longer to be used after a specified amount of time. For example, network device 220 may have information that the token is only valid for 24 hours. Network device 220 may terminate the use of the token.

Process 500 may include sending a result (block 520). For example, network device 220 may send a message, regarding the termination of a token, to the other party via application server 240 and/or user device 215. The other party may receive the message via the device. The other party may no longer use the token to retrieve private information regarding the subscriber and/or user device 210. Additionally, the message may include information regarding how the other party may not send the subscriber's private information to other parties, individuals, and/or companies. Additionally, the message may notify the other party that the other party may no longer use the private information regarding the subscriber and/or user device 210 after the subscriber has revoked his authorization.

Figure 6A:
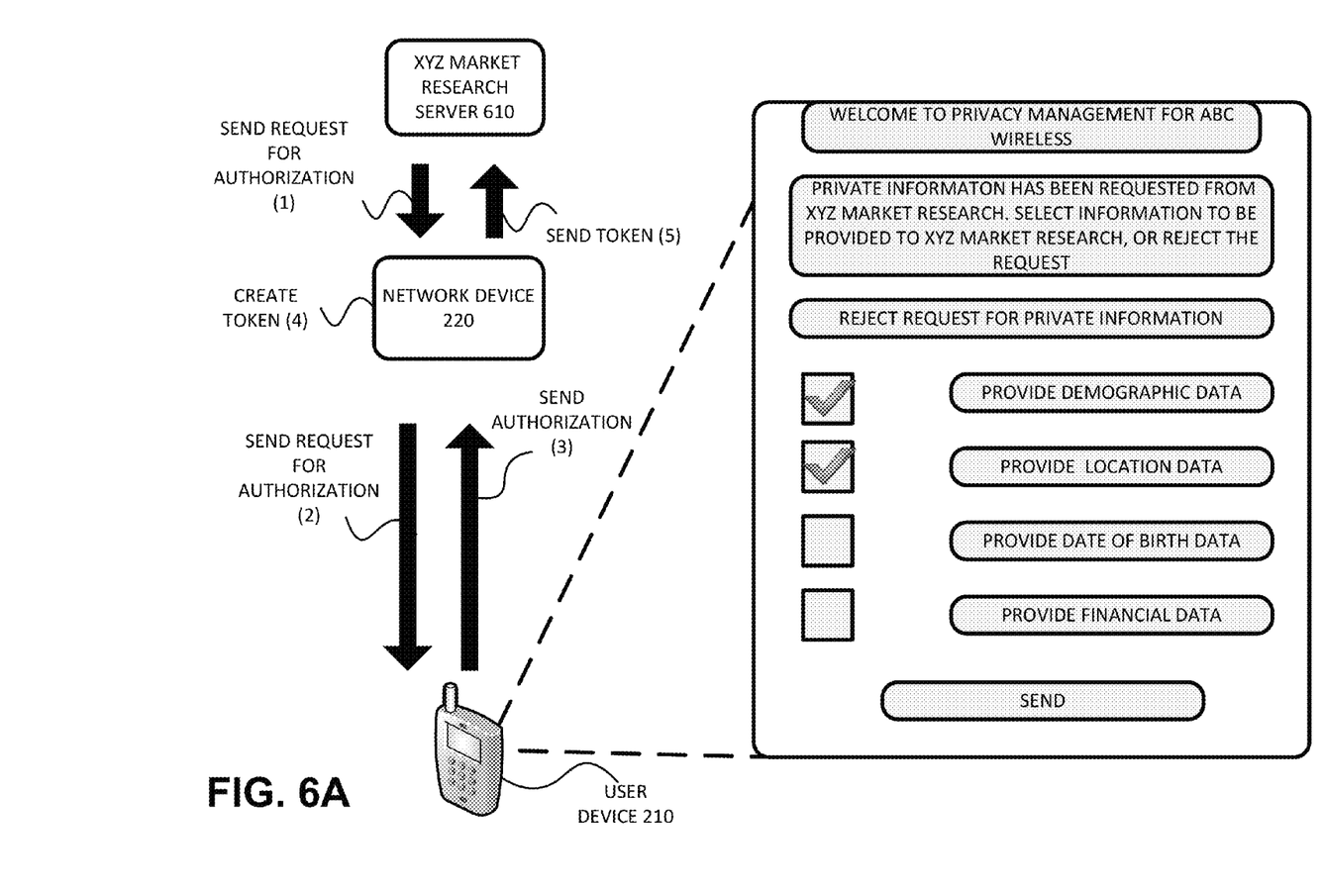
FIGS. 6A-6B are diagrams of an example process for creating and using a token.
Figure 6B:
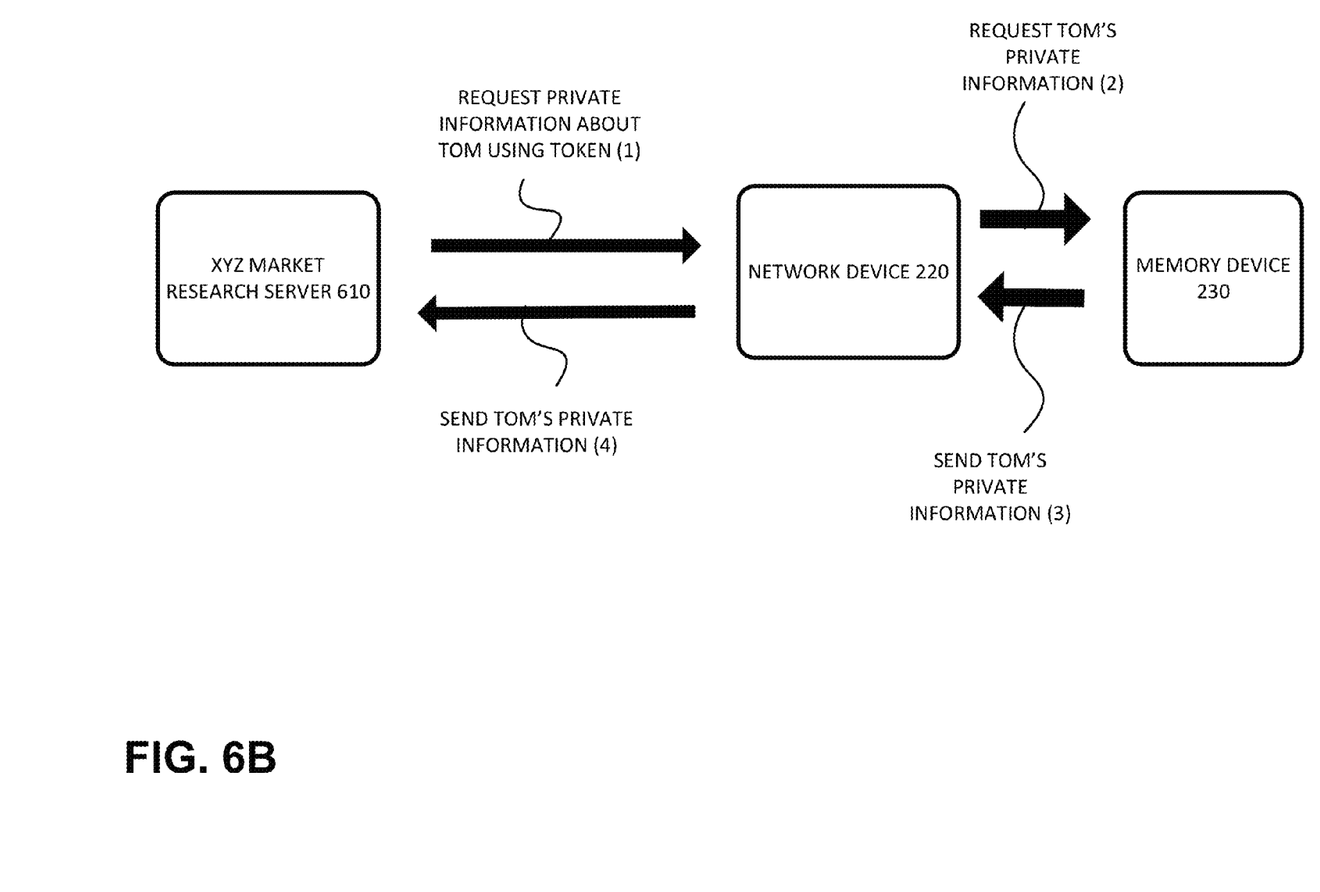

FIGS. 6A-6B are diagrams of an example process for generating and using a token. FIGS. 6A-6B show user device 210, network device 220, device 610, and memory device 230. An example of XYZ market research server 610 may correspond to application server 240, described with regard to FIG. 2. User device 210, network device 220, XYZ market research server 610, and memory device 230 may send messages to each other and communicate via a network, such as network 250 (described with regard to FIG. 2).

Assume that XYZ Market Research has an agreement with ABC Wireless to permit subscribers of ABC Wireless to send their private information to XYZ Market Research. Assume that the private information may be associated with a subscriber's location. Assume that XYZ Market Research is a provider of marketing research in the same areas that ABC Wireless provides services to ABC Wireless subscribers. Assume that XYZ Market Research has agreed to ABC Wireless' terms that a subscriber of ABC Wireless can select the type of private information that can be sent to XYZ Market Research.

XYZ Market Research would like to obtain private information regarding Tom, a subscriber of ABC Wireless. As shown in FIG. 6A, XYZ market research server 610 (operated by XYZ Market Research) sends a request for authorization, to receive Tom's private information, to network device 220 (part of a network operated by ABC Wireless) (identified by (1) in FIG. 6A). Network device 220 receives the request and determines that the request be sent to Tom's smart phone (user device 210) (identified by (2) in FIG. 6A). Tom receives a message, on user device 210, that there is a request for Tom's private information. Assume that Tom views the message, on user device 210, and that Tom clicks on an icon in the message that permits Tom to view a web page (or other user interface) associated with a privacy management application for ABC Wireless, as shown in FIG. 6A.

Tom decides that he would like to send only some of his private information to XYZ Market Research. Tom decides he would like to send information regarding his location information and his demographic information. For example, if Tom is at a restaurant and Tom has his smart phone (which is on), the smart phone may send pings or other communications to the network regarding the location of user device 210. The demographic data includes data regarding Tom's salary range (between $35,000 to $55,000), Tom's employer, Tom's ethnic and gender information, and the city in which Tom lives.

Tom sends the authorization to network device 220 to permit XYZ Market Research to receive the demographic and location information (identified by (3) in FIG. 6A). Network device 220 receives the authorization from user device 210. Network device 220 may create a token (identified by (4) in FIG. 6A) based on the authorization for Tom's private information from user device 210. The token may be used to access only the private information that Tom has provided permission for XYZ Market Research to receive regarding Tom from ABC Wireless. Network device 220 may send the token to XYZ market research server 610 (identified by (5) in FIG. 6A). XYZ market research server 610 may receive the token.

XYZ Market Research may begin to request private information regarding Tom. As shown in FIG. 6B, XYZ market research server 610 may send a request for private information (identified by (1) in FIG. 6B) regarding Tom by using the token sent to XYZ market research server 610 in FIG. 6A. Network device 220 may receive the token and determine, using the token, what particular private information regarding Tom should be sent to XYZ market research server 610. Network device 220 may determine that, based on Tom's authorization, Tom's demographic and location information may be sent to XYZ market research server 610. Network device 220 may send a request for Tom's private information to memory device 230 (identified by (2) in FIG. 6B). Memory device 230 may receive the request for Tom's private information. Memory device 230 may send the information requested by network device 220 (identified by (3) in FIG. 6B). Network device 220 may receive Tom's private information and may send the private information to XYZ market research server 610 (identified by (4) in FIG. 6B).

Systems and/or methods described herein may create a token that permits for sending private information, regarding a user of a network, to other parties, based on parameters regarding what private information may be sent. As a result, private information may only be sent to authorized requestors.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a network device and from a server device, a request for private information, associated with a user of a user device,
      the request originating from another user device;
   authenticating, by the network device, the server device associated with the request for private information, based on receiving the request,
      the authenticating the server device including authenticating that a party associated with the server device has agreed to a network provider's terms of use regarding the party's use of private information associated with the user of the user device;
   authenticating, by the network device, that the user device is registered with the network provider that provides service to the user device, based on receiving the request;
   authenticating, by the network device, that the other user device is authorized to receive the private information, based on receiving the request;
   sending, by the network device, a message to the user device requesting authorization to send the private information to the server device, based on results of authenticating the server device, authenticating the user device, and authenticating the other user device;
   receiving, by the network device, authorization from the user device to send the private information to the server device;
   generating, by the network device, a token used to request the private information, based on receiving the authorization;
   sending, by the network device, the token to the server device;
   receiving, by the network device, the token from the server device,
      the server device using the token to request the private information associated with the user; and
   sending, by the network device, the private information to the server device, based on receiving the token.

2. The method of claim 1, where generating the token includes:
   assigning a finite amount of time regarding how long the token can be used;
   terminating use of the token, by the server device, after the finite amount of time; and
   sending a notification to the server device that the token cannot be used to receive the private information after terminating use of the token.

3. The method of claim 1, further comprising:
   receiving a request, from the user device, to terminate the token;
   terminating the token, based on the request to terminate the token; and
   sending a notification to the server device that the token cannot be used to receive the private information after terminating the token.

4. The method of claim 1, further comprising:
   receiving a second request, from a second server device, for different private information, associated with the user of the user device, the different private information including information regarding a location of the user device;
   sending a second authorization request, to the user device, requesting the different private information;
   receiving a message from the user device that the second server device cannot receive the different private information; and
   sending a notification to the second server device that the user device does not provide authorization for the second server device to receive the different private information.

5. The method of claim 1, where generating the token includes:
   determining the private information that the token can be used to access, based on an agreement between the party and the network provider,
      the agreement including conditions for receiving and using the private information.

6. The method of claim 1, further comprising:
   storing information that indicates that the private information can only be sent when the user device is receiving content from a specified content provider; and
   where sending the private information includes:
      sending the private information based on the stored information.

7. A system comprising:
a network device to:
   receive a request, from a server device, for private information, associated with a user of a user device,
      the server device providing the request on behalf of another user device;
   authenticate, based on receiving the request, that the server device is associated with the request for private information,
      the authenticating including authenticating that a party associated with the server device has agreed to a network provider's terms of use regarding the party's use of private information associated with the user of the user device based on receiving the request;
   authenticate that the user device is registered with the network provider, based on receiving the request;
   authenticate that the other user device is allowed to receive the private information,
      the other user device executing an application associated with the party that agreed to the network provider's terms of use;
   send a message, to the user device, requesting authorization to send the private information to the other user device, based on results of authenticating the server device, authenticating the user device, and authenticating the other user device;
   receive, from the user device, the authorization to send the private information to the other user device,
      the authorization including how the private information can be used by the other user device;
   generate a token used to request the private information, based on receiving the authorization;
   send the token to the server device;
   receive the token from the server device,
      the server device using the token to request the private information;
   determine that the token is valid to request the private information; and
   send the private information to the server device, based on determining that the token is valid.

8. The system of claim 7, where the network device is further to:
   store information that indicates that the private information can only be sent when the user device is located in a specific geographic location; and
   where, when sending the private information, the network device is to:
      send the private information based on the stored information.

9. The system of claim 7, where the network device is further to:
   store information that indicates that the private information can only be sent when the user device is being used to send messages in a specific geographic location; and
   where, when sending the private information, the network device is to:
      send the private information based on the stored information.

10. The system of claim 7, where the network device is further to:
   store information that indicates that the private information can only be sent when the user device is being used at a particular time; and
   where, when sending the private information, the network device is to:
      send the private information based on the stored information.

11. The system of claim 7, where the network device is further to:
   receive a request to terminate use of the token by the user device;
   terminate use of the token, based on the request to terminate the token; and
   send a message to the other user device that the other user device can no longer receive the private information associated with the user device.

12. The system of claim 11, where the network device is further to:
   send a message to the server device that the private information, associated with the user device, cannot be sent to another device; and
   receive an acknowledgment from the server device that the private information is not to be sent to another device.

13. The system of claim 7, where the network device is further to:
   store information associated with a total number of times that the server device uses the token to request the private information associated with the user device; and
   use the stored information to determine whether the token is valid.

14. A computer-readable medium comprising:
a plurality of instructions, that when executed by one or more processors of one or more network devices, cause the one or more processors to:
   receive information associated with an agreement to provide private information associated with a user device,
      the agreement including a condition that the private information is to be sent to a server device;
   store the information associated with the agreement;
   receive a request to receive private information, associated with the user device, from the server device, based on the agreement;
   authenticate that the server device is associated with the request for private information, based on receiving the request,
      the authenticating including authenticating that a party associated with the server device has agreed to a network provider's terms of use regarding the party's use of private information associated with the user of the user device based on receiving the request;
   authenticate that the user device is registered with a network, based on receiving the request;
   authenticate that another user device is allowed to receive the private information from the server device, based on a relationship between the other user device and the server device;
   send an authorization request, based on results of authenticating the server device, authenticating the user device, and authenticating the other user device;
   receive authorization to send the private information to the server device;
   generate a token, based on receiving the authorization; and
   send the token to the server device,
      the server device using the token to request the private information associated with the user device.

15. The computer-readable medium of claim 14, where the plurality of instructions further cause the one or more processors to:

store information that indicates that the private information can only be sent when the user device is receiving content from a particular content provider; and
send the private information based on the stored information.

16. The computer-readable medium of claim 14, where the plurality of instructions further cause the one or more processors to:
store information that indicates that the private information can only be sent during a finite period of time after the token is generated; and
send the private information based on the stored information.

17. The computer-readable medium of claim 14, further comprising:
one or more instructions, that, when executed by the one or more processors, cause the one or more processors to:
receive a change to the agreement regarding what private information may be sent to the server device; and
modify the agreement based on the received change.

18. The computer-readable medium of claim 14, further comprising:
one or more instructions, that, when executed by the one or more processors, cause the one or more processors to:
revoke use of the token based on the agreement; and
send a message to the server device that the token is revoked and that the server device cannot use the token to receive the private information.

19. The computer-readable medium of claim 14, further comprising:
one or more instructions, that, when executed by the one or more processors, cause the one or more processors to:
store information associated with a total quantity of times that the token is used to request the private information; and
use the stored information to determine whether the token is valid.

20. The computer-readable medium of claim 14, further comprising:
one or more instructions that, when executed by the one or more processors, cause the one or more processors to:
receive a notification from the user device, regarding how the private information may be used; and
use the notification to amend the agreement.

* * * * *